United States Patent
Clark et al.

(10) Patent No.: US 12,277,672 B2
(45) Date of Patent: Apr. 15, 2025

(54) GENERATIVE ADVERSARIAL NETWORKS WITH TEMPORAL AND SPATIAL DISCRIMINATORS FOR EFFICIENT VIDEO GENERATION

(71) Applicant: DeepMind Technologies Limited, London (GB)

(72) Inventors: Aidan Clark, London (GB); Jeffrey Donahue, London (GB); Karen Simonyan, London (GB)

(73) Assignee: DeepMind Technologies Limited, London (GB)

( * ) Notice: Subject to any disclaimer, the term of this patent is extended or adjusted under 35 U.S.C. 154(b) by 525 days.

(21) Appl. No.: 17/613,694

(22) PCT Filed: May 22, 2020

(86) PCT No.: PCT/EP2020/064270
§ 371 (c)(1),
(2) Date: Nov. 23, 2021

(87) PCT Pub. No.: WO2020/234449
PCT Pub. Date: Nov. 26, 2020

(65) Prior Publication Data
US 2022/0230276 A1     Jul. 21, 2022

Related U.S. Application Data
(60) Provisional application No. 62/852,176, filed on May 23, 2019.

(51) Int. Cl.
     *G06T 3/4046*      (2024.01)
     *G06N 3/045*      (2023.01)
     *G06N 3/08*      (2023.01)

(52) U.S. Cl.
CPC .......... *G06T 3/4046* (2013.01); *G06N 3/045* (2023.01); *G06N 3/08* (2013.01); *G06T 2207/20081* (2013.01)

(58) Field of Classification Search
CPC ........ G06N 3/045; G06N 3/08; G06N 3/0475; G06N 3/047; G06N 3/084; G06N 3/044;
(Continued)

(56) References Cited

U.S. PATENT DOCUMENTS 11,449,751 B2 *  9/2022  Liu ................... G06V 10/82
11,763,168 B2 *  9/2023  Karras ............... G06N 3/082
                                                                         706/25
(Continued)

FOREIGN PATENT DOCUMENTS

KR      20190091806 A   *   8/2019

OTHER PUBLICATIONS

Saxe et al., "Exact solutions to the nonlinear dynamics of learning in deep linear neural networks," CoRR, Dec. 20, 2013, arXiv:1312.6120, 22 pages (Year: 2013).*

(Continued)

*Primary Examiner* — Henok Shiferaw
*Assistant Examiner* — Woo C Rhim
(74) *Attorney, Agent, or Firm* — Fish & Richardson P.C.

(57) ABSTRACT

The present disclosure proposes the use of a dual discriminator network that comprises a temporal discriminator network for discriminating based on temporal features of a series of images and a spatial discriminator network for discriminating based on spatial features of individual images. The training methods described herein provide improvements in computational efficiency. This is achieved by applying the spatial discriminator network to a set of one or more images that have reduced temporal resolution and applying the temporal discriminator network to a set of (Continued)

images that have reduced spatial resolution. This allows each of the discriminator networks to be applied more efficiently in order to produce a discriminator score for use in training the generator, whilst maintaining accuracy of the discriminator network. In addition, this allows a generator network to be trained to more accurately generate sequences of images, through the use of the improved discriminator.

13 Claims, 6 Drawing Sheets

(58) Field of Classification Search
CPC .......... G06N 3/088; G06N 20/00; G06N 3/04; G06N 3/049; G06N 3/094; G06N 3/0455; G06N 3/0464; G06N 3/09; G06N 3/02; G06V 10/82; G06V 10/764; G06V 20/41; G06V 20/46; G06V 10/776; G06V 20/40; G06V 40/168; G06V 10/7715; G06V 10/40; G06V 10/44; G06V 10/771; G06V 10/806; G06T 2207/10016; G06T 2207/20084; G06T 2207/20081; G06T 9/002; G06T 11/00; G06T 3/4046; G06F 18/213
See application file for complete search history.

(56) References Cited

U.S. PATENT DOCUMENTS

| | | | | |
|---|---|---|---|---|
| 2019/0012581 | A1* | 1/2019 | Honkala | G06V 10/758 |
| 2019/0130278 | A1* | 5/2019 | Karras | G06V 10/82 |
| 2019/0251360 | A1* | 8/2019 | Cricri | G06V 10/82 |
| 2020/0134804 | A1* | 4/2020 | Song | G06V 10/764 |
| 2020/0302231 | A1* | 9/2020 | Nawhal | G06F 18/211 |
| 2020/0372618 | A1* | 11/2020 | Zhang | G06N 3/047 |
| 2021/0118099 | A1* | 4/2021 | Kearney | A61B 6/5217 |
| 2021/0334642 | A1* | 10/2021 | Navarrete Michelini | G06N 3/047 |
| 2021/0342976 | A1* | 11/2021 | Navarrete Michelini | G06T 5/90 |
| 2021/0365744 | A1* | 11/2021 | Navarrete Michelini | G06F 18/241 |

OTHER PUBLICATIONS

Soomro et al., "UCF101: A dataset of 101 human actions classes from videos in the wild," CoRR, Dec. 3, 2012, arXiv:1212.0402, 7 pages (Year: 2012).*
Office Action in European Appln. No. 20728455.5, dated Mar. 15, 2024, 9 pages.
Acharya et al., "Towards high resolution video generation with progressive growing of sliced wasserstein gans," CoRR, May 22, 2018, arXiv:1810.02419, 60 pages.
Arjovsky et al., "Wasserstein GAN," CoRR, Jan. 26, 2017, arxiv.org/abs/1701.07875, 32 pages.
Babaeizadeh et al., "Stochastic variational video prediction," CoRR, Oct. 30, 2017, arxiv.org/abs/1710.11252, 15 pages.
Ballas et al., "Delving deeper into convolutional networks for learning video representations," CoRR, Nov. 19, 2015, arXiv:1511.06432, 11 pages.
Bansal et al., "Recycle-gan: Unsupervised video retargeting.," CoRR, Oct. 6, 2018, arxiv.org/abs/1808.05174, 17 pages.
Barratt et al., "A note on the inception score," CoRR, Jan. 6, 2018, arXiv:1801.01973, 9 pages.
Brock et al., "Large Scale GAN Training for High Fidelity Natural Image Synthesis," CoRR, Sep. 28, 2018, arxiv.org/abs/1809.11096, 35 pages.
Spampinato et al., "Adversarial Framework for Unsupervised Learning of Motion Dynamics in Videos," International Journal of Computer Vision, Oct. 8, 2019, 128:1378-1397.
Carreira et al., "A short note about Kinetics-600," CoRR, Aug. 3, 2018, arXiv:1808.01340, 6 pages.
Carreira et al., "Quo vadis, action recognition? A new model and the kinetics dataset," Proceedings of the IEEE Conference on Computer Vision and Pattern Recognition, Jul. 1, 2017, pp. 6299-6308.
Child et al., "Generating long sequences with sparse transformers," CoRR, Apr. 23, 2019, arXiv:1904.10509, 10 pages.
Clark et al., "Adversarial Video Generation on Complex Datasets," CoRR, Jul. 15, 2019, arxiv.org/abs/1907.06571, 21 pages.
cloud.google.com [online], "Cloud TPU," May 2017, retrieved on Apr. 19, 2022, retrieved from URL<https://cloud.google.com/tpu//>, 9 pages.
De Vries et al., "Modulating early visual processing by language," Advances in Neural Information Processing Systems, Jul. 2, 2017, 11 pages.
Denton et al., "Stochastic video generation with a learned prior," Proceedings of the 35th International Conference on Machine Learning, Jul. 3, 2018, 80:1174-1183.
Dumoulin et al., "A learned representation for artistic style," CoRR, Oct. 24, 2016, arxiv.org/abs/1610.07629, 26 pages.
Ebert et al., "Self-supervised visual planning with temporal skip connections," InCoRL, Nov. 13, 2017, pp. 344-356.
Goodfellow et al., "Generative adversarial nets," Advances in Neural Information Processing Systems 27, Oct. 22, 2020, pp. 2672-2680.
Gorelick et al., "Actions as space-time shapes," IEEE Transactions on Pattern Analysis and Machine Intelligence, Nov. 5, 2007, 29(12):2247-2253.
Gulrajani et al., "Improved training of wasserstein gans," Advances in Neural Information Processing Systems 30, Dec. 25, 2017, pp. 5767-5777.
Heusel et al., "Gans trained by a two time-scale update rule converge to a local nash equilibrium," Advances in Neural Information Processing Systems, Jun. 26, 2017, pp. 6626-6637.
Hsieh et al., "Learning to decompose and disentangle representations for video prediction," Advances in Neural Information Processing Systems 31, Jun. 11, 2018, pp. 517-526.
International Preliminary Report on Patentability in International Appln. No. PCT/EP2020064270, dated Nov. 23, 2021, 16 pages.
International Search Report and Written Opinion in International Appln. No. PCT/EP2020064270, dated Oct. 9, 2020, 21 pages.
Ioffe et al., "Batch normalization: Accelerating deep network training by reducing internal covariate shift," Proceedings of the 32nd International Conference on Machine Learning, Jun. 1, 2015, 37:448-456.
Kalchbrenner et al., "Video pixel networks," Proceedings of the 34th International Conference on Machine Learning, Jul. 17, 2017, 70:1771-1779.
Karras et al., "A style-based generator architecture for generative adversarial networks," Proceedings of the IEEE/CVF Conference on Computer Vision and Pattern Recognition, Jan. 1, 2019, pp. 4401-4410.
Kay et al., "The Kinetics human action video dataset," CoRR, May 19, 2017, arXiv:1705.06950, 22 pages.
Kingma et al., "Adam: A method for stochastic optimization," CoRR, Dec. 22, 2014, arXiv:1412.6980, 15 pages.
Kingma et al., "Glow: Generative flow with invertible 1x1 convolutions," Advances in Neural Information Processing Systems, Dec. 3, 2018, pp. 10215-10224.
Kumar et al., "Videoflow: A flow-based generative model for video," arXiv:1903.01434, Mar. 4, 2019, 13 pages.
Lee et al., "Stochastic adversarial video prediction," CoRR, Apr. 4, 2018, arXiv:1804.01523, 26 pages.
Lim et al., "Geometric GAN," CoRR, May 8, 2017, arXiv:1705.02894, 17 pages.
Mathieu et al., "Deep multi-scale video prediction beyond mean square error," CoRR, Nov. 17, 2015, arXiv:1511.05440, 14 pages.
Menick et al., "Generating high fidelity images with subscale pixel networks and multidimensional upscaling," CoRR, Dec. 4, 2018, arxiv.org/abs/1812.01608, 15 pages.
Miyato et al., "cGANs with projection discriminator," CoRR, Feb. 15, 2018, arXiv:1802.05637, 21 pages.

(56) References Cited

OTHER PUBLICATIONS

Miyato et al., "Spectral normalization for generative adversarial networks," CoRR, Feb. 16, 2018, arXiv:1802.05957, 26 pages.
Ohnishi et al., "Hierarchical video generation from orthogonal information: Optical flow and texture," Thirty-Second AAAI Conference on Artificial Intelligence, Apr. 26, 2018, 32(1):2387-2394.
Ranzato et al., "Video (language) modeling: a baseline for generative models of natural videos," CoRR, Dec. 20, 2014, arxiv.org/abs/1412.6604, 15 pages.
Saito et al., "Temporal generative adversarial nets with singular value clipping," Proceedings of the IEEE International Conference on Computer Vision, Oct. 22, 2017, pp. 2830-2839.
Saito et al., "Tganv2: Efficient training of large models for video generation with multiple subsampling layers," arXiv preprint arXiv:1811.09245, Nov. 1, 2018, 12 pages.
Sajjadi et al., "Assessing generative models via precision and recall," Advances in Neural Information Processing Systems, Jan. 1, 2018, pp. 5228-5237.
Salimans et al., "Improved techniques for training gans," Advances in Neural Information Processing Systems 29, Jun. 10, 2016, pp. 2234-2242.
Saxe et al., "Exact solutions to the nonlinear dynamics of learning in deep linear neural networks," CoRR, Dec. 20, 2013, arXiv:1312.6120, 22 pages.
Soomro et al., "UCF101: A dataset of 101 human actions classes from videos in the wild," CoRR, Dec. 3, 2012, arXiv:1212.0402, 7 pages.
Srivastava et al., "Unsupervised learning of video representations using LSTMs," International Conference on Machine Learning, Jun. 1, 2015, 37:843-852.
Szegedy et al., "Rethinking the inception architecture for computer vision," Proceedings of IEEE Conference on Computer Vision and Pattern Recognition, Jan. 1, 2016, pp. 2818-2826.
Tran et al., "Learning spatiotemporal features with 3d convolutional networks," Proceedings of the IEEE international conference on computer vision, Dec. 7, 2015, pp. 4489-4497.
Tulyakov et al., "MoCoGAN: Decomposing Motion and Content for Video Generation," Proceedings of the IEEE Conference on Computer Vision and Pattern Recognition, Jul. 17, 2017, pp. 1526-1535.
Unterthiner et al., "Towards accurate generative models of video: A new metric & challenges," CoRR, Dec. 3, 2018, arXiv:1812.01717, 17 pages.
Vaswani et al., "Attention is all you need," Advances in Neural Information Processing Systems 30, Dec. 6, 2017, pp. 5998-6008.
Villegas et al., "Learning to generate long-term future via hierarchical prediction," Proceedings of the 34th International Conference on Machine Learning, Jul. 17, 2017, pp. 3560-3569.
Vondrick et al., "Generating videos with scene dynamics," Advances in Neural Information Processing Systems 29, Dec. 5, 2016, pp. 613-621.
Walker et al., "The pose knows: Video forecasting by generating pose futures," Proceedings of the IEEE International Conference on Computer Vision, Apr. 28, 2017, pp. 3332-3341.
Wang et al., "Video-to-video synthesis," CoRR, Aug. 20, 2018, arxiv.org/abs/1808.06601, 14 pages.
Xie et al., "tempoGAN: A temporally coherent, volumetric gan for super-resolution fluid flow," ACM Transactions on Graphics, Jul. 30, 2018, 37(4):1-15.
Xu et al., "A two-stream variational adversarial network for video generation," arXiv preprint arXiv:1812.01037, Dec. 3, 2018, 17 pages.
Yang et al., "Pose guided human video generation," Proceedings of the European Conference on Computer Vision, Oct. 6, 2018, pp. 201-216.
Zhang et al., "Self-attention generative adversarial networks," Proceedings of the 36th International Conference on Machine Learning, May 24, 2019, 97:7354-7363.
Zhou et al., "Dance dance generation: Motion transfer for internet videos," Proceedings of the IEEE/CVF International Conference on Computer Vision, Oct. 1, 2019, 9 pages.

* cited by examiner

GENERATIVE ADVERSARIAL NETWORKS WITH TEMPORAL AND SPATIAL DISCRIMINATORS FOR EFFICIENT VIDEO GENERATION

CROSS-REFERENCE TO RELATED APPLICATION

This application is a National Stage Application under 35 U.S.C. § 371 and claims the benefit of International Application No. PCT/EP2020/064270, filed May 22, 2020, which claims priority to U.S. Application No. 62/852,176, filed May 23, 2019, entitled Generative Adversarial Networks with Temporal and Spatial Discriminators for Efficient Video Generation, the disclosure of which is incorporated herein by reference.

BACKGROUND

This specification relates to neural network systems that generate data items which are samples from a distribution.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification generally describes how a system implemented as computer programs in one or more computers in one or more locations can perform a method to train (that is, adjust the parameters of) an adaptive system which is a Generative Adversarial Network (GAN) comprising a generator network and a discriminator network, based on training set of data items selected from a distribution. The generator network, once trained, may be used to generate samples from the distribution based on latent values (or simply "latents") selected from a latent value distribution (or "latent distribution"). In particular, the implementations described herein produce a generator network for generating a sequence of images that detail a temporal sequence (such as a video comprising a series of frames).

In general terms, the disclosure proposes the use of a duel discriminator network that comprises a temporal discriminator network for discriminating based on temporal features of a series of images and a spatial discriminator network for discriminating based on spatial features of individual images. The training methods described herein provide improvements in computational efficiency. This is achieved by applying the spatial discriminator network to a set of one or more images that have reduced temporal resolution (relative to the input images) and applying the temporal discriminator network to a set of images that have reduced spatial resolution (relative to the input images). This allows each of the discriminator networks to be applied more efficiently (e.g. over a reduced number of processing steps) in order to produce a discriminator score for use in training the generator, whilst maintaining accuracy of the discriminator network. In addition, this allows a generator network to be trained to more accurately generate sequences of images, through the use of the improved discriminator.

Moreover, the use of separate temporal and spatial discriminator networks allows the use of parallel processing to improve the speed and efficiency of the discriminator network. For instance, the spatial discriminator network may be implemented in parallel to the temporal discriminator network (e.g. through a GPU). This allows the method to leverage parallel processing to speed up the processing of the discriminator network. As the temporal and spatial discriminators act on a reduced feature space and on data of reduced resolution, this results in a quicker and more efficient discriminator network.

In addition, the disclosure proposes a more efficient generator network that makes use a factorized self-attention. Self-attention allows the generator to weight the relative influence of embeddings across all time steps when generating each image. In other words, a weighted combination of all embeddings is used when each image is generated. The present disclosure proposes a three-layer attention network, with each layer applying attention across a corresponding one of height features, width features and time features. By applying factorization to separate out the attention steps relating to these three feature spaces, the amount of memory storage required to implement self-attention is greatly reduced. This method can drastically reduce the memory footprint (e.g. 3000 fold). Experiments have shown this process to reduce the memory footprint from 150 GB to 50 MB (a reduction of 99.97%), thereby allowing the process to be performed in using conventional accelerators.

Specifically, this document relates to training a discriminator network for use in training a generator to generate a sequence of images representing a temporal progression. The discriminator network is for distinguishing between sequences of images generated by the generator network and sequences of images which are not generated by the generator network. The discriminator network comprises a temporal discriminator network for discriminating based on temporal features and a spatial discriminator network for discriminating based on spatial features. The temporal discriminator network and the spatial discriminator network each comprise a multi-layer network of neurons in which each layer performs a function defined by corresponding weights. The training comprises:

receiving an input sequence of images representing a temporal progression;

forming, from the input sequence, a first set of one or more images having a lower temporal resolution than the input sequence, and inputting the first set into the spatial discriminator network to determine, based on the spatial features of each image in the first set, a first discriminator score representing a probability that the input sequence has been generated by the generator network;

forming, from the input sequence, a second set of images having a lower spatial resolution than the input sequence, and inputting the second set into the temporal discriminator network to determine, based on the temporal features of the images in the second set, a second discriminator score representing a probability that the input sequence has been generated by the generator network; and varying weights of the discriminator network based on the first discriminator score and the second discriminator score.

Experimentally, it has been found that this method allows a discriminator network to be trained much more efficiently for use in training a generator to produce more accurate sequences of images (e.g. videos). As separate spatial and temporal discrimination is applied, each discriminator network can be supplied with a sample from the input images that has reduced resolution in the feature space that is not being directly considered. That is, the spatial discriminator network is supplied with a set of one or more images of reduced temporal resolution and the temporal discriminator network is supplied with a set of images with reduced spatial resolution. By improving the efficiency of discrimination, the overall efficiency of training a generative adversarial network is improved, thereby allowing more accurate generators to be trained using the same computing resources.

The input sequence of images may have been generated by the generator or may be provided by another source (e.g. might be real images of a real environment). The input sequence of images might be a video (e.g. a sequence of frames of optical images) or might be some other form of temporal progression (e.g. a sequence of LiDAR images). Each image may be formed from measurements taken from one or more sensors. For instance, each image might be a multi-sensory image (e.g. an image formed through a fusion of data from a number of sensors). The sensors may sense a variety of types of measurement (for instance, sound, light, vibration, etc.). Importantly, the images form a temporal progression so that there is some temporal relationship between the images.

Forming the first set might comprise selecting a subset comprising one or more images from the input sequence of images, such that the first set has fewer images than the input sequence. That is, a sample of k images might be chosen from the input sequence of images, where k is less than the total number of images in the input set, L. Each image in the first set may have the same spatial resolution as the images in the input sequence. That is, the selection of the first set might not involve altering spatial resolution of the individual images. For instance, for an input sequence of L images, each having a H×W pixels, the first set is formed to be a sequence of k images, each having H×W pixels, where k<L. In other words, the first set has a lower temporal resolution than the input sequence. The subset may be selected at random from the input sequence of images.

Forming the second set might comprise selecting two or more images from the input sequence and reducing the spatial resolution for each of the selected one or more images. That is, each selected image might be transformed in order to reduce its spatial resolution. Where each image is an H×W image, each image might be mapped to a lower resolution, H'×W' image, according to a downsampling function (mapping) $\phi(\cdot)$. The downsampling function may be a differentiable function that reduces the spatial resolution of each image. The downsampling function might be an average pooling function (e.g. a 2×2 average pooling function). One or both of H'<H and W'<W. The temporal resolution of the second set might be the same as the temporal resolution of the input sequence. That is, the second set might comprise a reduced spatial resolution version of each image in the input sequence. Accordingly, the second set might also comprise L images.

In light of the above, the first set might have a higher temporal resolution but lower spatial resolution than the second set.

Varying weights of the discriminator network might comprise varying weights of the spatial discriminator network based on the first discriminator score and varying weights of the temporal discriminator network based on the second discriminator score. That is, the spatial discriminator network and the temporal discriminator network might be trained independently of each other based on their corresponding discriminator scores. This might be based on corresponding loss functions for the spatial and temporal discriminator network. Each discriminator network may be trained based on an objective function that aims to adjust (optimize) the parameters of the corresponding discriminator network to more accurately classify the image(s) input into the discriminator network as either generated by the generator network or not generated by the generator network (e.g. "real" images of an environment as opposed to generated images). The generator network might be trained with an objective function that aims to cause each discriminator network to misclassify the generated sequence of images. The generator network may be configured to generate sequences of images based solely on learned distributions without relying on any predefined prior distributions for foreground, background or motion (e.g. without making use of any predefined models for optical flow).

The first set might comprises more than one image and determining the first discriminator score might comprise: determining, for each image in the first set, a corresponding discriminator value representing the probability that the image was generated by the generator network; and combining the discriminator values for the images in the first set to produce the first discriminator score. That is, the first discriminator score might be a combination of individual discriminator scores for each individual image in the first set. Determining the first discriminator score might include summing over the discriminator values across the first set. Each discriminator value might be determined based on only a single corresponding image from the first set. That is, the spatial discriminator network considers each image in the first set independently of the other images in the first set and produces a corresponding discriminator value for each image in the first set. This avoids the discriminator learning temporal features across the first set. Applying the spatial discriminator to multiple images and summing the discriminator scores for the images provides a more accurate classification by the discriminator.

As noted above, the training of the discriminator network may be used to train a generator network. Specifically, a generator might be trained to generate, based on set of latent values, a sequence of images representing a temporal progression, by include jointly training the generator network and a discriminator network. The discriminator network may be trained according to any of the methods described herein based on input sequences of images generated by the generator network.

Furthermore, the discriminator network might be used to condition a generator network in order allow the generator network to generate a continuation of an initial sequence of images. Specifically, a sequence of images might be generated that are a continuation of an initial sequence of images representing a temporal progression. This might comprise:

inputting the initial sequence of images into a spatial discriminator network trained according to any of the methods described herein to produce a classification for each of the initial sequence of images;

forming an embedding of the classifications; and utilizing the embedding to condition a generator network to generate a sequence of images that are a continuation of the initial sequence of images.

The generator network may comprise a recurrent network and utilizing the embedding to condition the generator network may comprise inputting the embedding as an initial state of the recurrent network. The recurrent network might be a convolutional gated recurrent network (ConvGRU).

The continuation of the initial sequence of images might be concatenated after the initial sequence of images to form a generated sequence which might be input into a discriminator network (such as one trained according to the methods described herein). The output of the discriminator network might be used to train the generator network.

Forming the embedding of the classifications might comprise inputting the classifications into a self-attention block to form a tensor that combines information across the classifications.

The generator network and/or the discriminator network may each comprise one or more convolutional layers. Further, the generator network and/or the discriminatory network may contain one or more "non-local" layers, such as self-attention layers, e.g. following respective convolutional layers. A self-attention layer may receive a vector of values from the immediately preceding layer, and transform it into an output vector of values based on multiple weight matrices. Specifically, the input vector may be transformed into three feature spaces, f, g and h, by multiplying it by respective weight matrices $W_f$, $W_h$ and $W_g$, and the features in feature space h are combined by a matrix of weights which are formed from a normalized inner product of the features in feature spaces f and g. The original input vector may be added to a result of this operation (which may first be multiplied by a scalar value), to generate the output vector.

One of more of the layers of the generator network and/or discriminator network may be residual blocks in which the output of the block is a sum of the input to the block and a function applied to the input to the block. For example, the function may be implemented by a layer of neurons which produce outputs defined by weights, with the outputs of the neurons being subject to a non-linear operation, for example carried out by a respective rectified linear unit (ReLU).

The generator network and/or discriminator network may further contain other layer(s), such as one of more batch normalization layers, e.g. conditional batch normalization layers. A batch normalization layer is a layer which transforms its input values into respective output values which have a predefined mean value (e.g. zero) and predefined variance (e.g. unit variance), by applying a gain and bias to the input values (which in the case of conditional batch normalization may depend on a data set referred to below as a conditional vector which is input to the batch normalization layer).

Iterative modification of the generator network may employ regularization. For example, it may be performed using a cost function which includes a regularization term which is based on at least one norm of weights of the generator network (e.g. a norm formed using single vector formed by some or all the weights of the generator network; or multiple norms generated from weights of respective layers of the generator network, or from weights of respective groups of one or more of the neurons). The regularization matrix may be constructed by forming an inner product of a weight matrix of weights of the generator network and a transpose of the weight matrix.

The operation of the generator network may be controlled based on a conditional vector which is input to the generator network. For example, the conditional vector may indicate to the generator network that the generated sequence of images is to be selected from a portion of the distribution specified by the conditional vector. For example, if the distribution of which the generator is supposed to generate sequences causes the generator network to generate sequences that fall into one of a plurality of predefined classes, the conditional vector may comprise one or more data values indicative of a selected one of the classes (e.g. a class label indicative of one of the classes). The generator network may include at least one conditional layer which receives at least a portion of the conditional vector, and performs a function dependent on the received conditional vector (e.g. a class label). In this way, the generator network may be controlled, e.g. to generate a sample of the distribution which corresponds to a controlled one of the classes. Preferably, there are a plurality of conditional layers. The (or each) conditional layer may be implemented as a BatchNorm layer having gains and/or biases which are dependent upon the conditional vector. During the training process for the generator network, the conditional vector may be selected from a distribution, and the cost function may apply an additional cost if the generator network generates a sample from that specified by the conditional vector (e.g. a sample which is in a different class of the distribution from that specified by the conditional vector).

Further improvements described herein provide a more efficient generator network that applies self-attention whilst maintaining a low memory footprint.

Specifically, there is provided a computer implemented method for generating, via a generator network comprising an encoder network and an attention network, a sequence of images representing a temporal progression. The method comprises: encoding, via the encoder network, a set of latent values across a series of time steps to produce a feature map for each time step, each feature map relating to a corresponding output image for the time step and encoding information relating to a time dimension, a height dimension and a width dimension; and applying the attention network to the feature maps to determine the influence of each location in each feature map on each position in each image. The attention network comprises: a height attention layer configured to determine a height attention map by applying attention to all feature maps across the height dimension; a width attention layer configured to, for each time step, determine a width attention map by applying attention to all feature maps across the width dimension; and a time attention layer configured to, for each time step, determine a time attention map by applying attention to all feature maps across the time dimension. The generator network determines, for each time step, an image for the time step by applying the height, width and time attention maps to a decoding of the feature maps.

By separating the height, width and temporal features, self-attention may be applied in the generator network to improve the accuracy of the generated images with a reduced memory footprint. Self-attention is applied to each of the height, width and temporal features separately. This applies weighting to the relevant features across each time step (for each image being generated). Applying attention separately reduces the size of the tensors calculated, thereby reducing the memory footprint of the method and allowing it to be performed on conventional processors.

The attention network may be applied as a layer within a decoder network that receives as an input the feature map for each time step and that outputs the generated sequence of images. The decoder network might comprise a set of decoders arranged in parallel, wherein each decoder is configured to output a corresponding image for a corresponding time step based on the feature map for that time step. Each decoder might be a residual network. Each decoder might generate the corresponding image based on the latent vectors. Each decoder might contain a corresponding set of attention layers comprising a corresponding height, width and temporal attention layer. That is, the attention network might comprise sets of attention layers distributed across the decoders, with one set of attention layers per decoder. The attention layers may be the penultimate layer within the decoder, with the final layer upscaling the output of the attention layers. Operating a set of decoders in parallel allows the images to be generated in parallel to speed up the generation of the sequence of images (e.g. through use of a parallel processor such as a GPU).

The height attention layer, width attention layer and time attention layer may be applied sequentially, with an output of a first of the layers being utilized as an input for a second of the layers and an output of the second of the layers being utilized as an input of a third of the layers. The height, width and attention layers may be sequentially applied in any order.

The height attention layer may map its input onto the height dimension using the height attention map, the width attention layer may map its input onto the width dimension using the width attention map and the time attention layer may map its input onto the time dimension using the time attention map, such that the attention network outputs an image for each time step, each image having values mapped to the height and width dimensions. As discussed above, the attention network may be a set of attention layers in each of a set of decoders that are operated in parallel. Accordingly, each set of attention layers may map the input data onto the width, height and time dimensions in order to generate a corresponding image for a corresponding time step.

An additional attention layer (e.g. a non-causal self-attention block) may be applied to the feature maps prior to input into the attention network and decoder network. This can help to further improve the accuracy of the generated images. The additional attention layer may act over a reduced number of features relative to the attention network, thereby avoiding the need to separate out attention on the width, height and time dimensions.

A computer implemented method for training a generator network may comprise:
generating a sequence of images utilizing a generator network;
training a discriminator network according any of the discriminator training methods described herein utilizing the generated sequence of images as the input sequence of images for the discriminator network; and updating weights for the generator network based on the first discriminator score and the second discriminator score.

The sequence of images may be generated according to any of the image generation methods described herein. The generator network might comprise the attention layer discussed above.

Updating the weights for the generator network may comprise forming a combined discriminator score based on the first and second discriminator scores and updating the weights for the generator network based on the combined discriminator score.

Discriminator network(s) or generator network(s) may be produced by the training methods described herein. The methods described herein may be stored as computer readable instructions in a system comprising one or more computers and one or more storage devices that store the instructions. When the instructions are executed by the one or more computers this may cause the one or more computers to perform the operations of the respective method. One or more computer storage media may store instructions that when executed by one or more computers cause the one or more computers to perform the operations of the methods described herein.

The methods described herein aim to train a discriminator network for use in training a generator network to generate sequences of images based on latent values. My applying separate spatial and temporal discriminator networks, and providing images of reduced spatial resolution to the temporal discriminator network and providing image(s) of reduced temporal resolution to the spatial discriminator network, the discriminator network can be trained more efficiently and accurately and can thereby be used to train a generator network more efficiently and accurately. In addition, methods are provided for reducing the memory footprint when applying self-attention to the generator network. This is achieved by separating the attention network into separate height, width and temporal attention layers.

The generator may generate sequences of images based on latent values. The latent values may evolve during a plurality of time steps (e.g. due to a resampling of some of the variables from the latent distribution), and the corresponding sequences of images output by the generator network may thus represent a sequence of samples of the distribution.

The images may be data representing a still or moving image, wherein individual numerical values contained in the data item may represent pixel values, for example values of one or more color channels of the pixels. The training images used for training the discriminator network (and, potentially by extension, training the generator network) may be images of the real world, captured by a camera.

For example, in one implementation, a user may use the trained generator network to generate sequences of images (e.g. videos) from an image distribution (e.g. a distribution reflecting a database of training images with which the generator network was produced, e.g. reflective of real-world images). The user supplies user input, and from it the computer determines the sequence of images. Where separable self-attention is being utilized, each image is generated using a weighted combination of embeddings across each time step. Thus, images are generated which have high fidelity to the training images. As separable self-attention is used, a lower memory footprint is required.

The generator network may generate the data item conditioned upon a conditional vector (target data) input to the generator network, representing a target for generating the data item. The target data may represent the same or a different type or modality of data to the generated sequence of images. For example, the target data may define a label or class of one of the images for generation and the generated sequence of images may then comprise an example image of that type (e.g. African elephant). Or the target data may comprise an image or an encoding of an image (or sequence of images), and the generated sequence of images may define another, similar sequence of images—for example when trained on images of faces, the target data may comprise an encoding of a person's face and the generator network may then generate a sequence of images representing a similar face with a different pose/lighting condition. In another example, the target data may show an image of a subject and include data defining a movement/change of a viewpoint, and the generator network could generate a sequence of images of the subject from the new viewpoint.

The system may also generate video autoregressively, in particular given one or more previous video frames. These previous video frames may be used to condition the generator by applying an encoding of a set of classifications of the frames as an initial state of a recurrent network in the generator network.

In another example, the generator network may be used to generate further sequences of images for training another machine learning system. For example the generator network and discriminator network may be jointly trained on a set of videos and then the generator network may be used to generate new videos similar to those in the training data set. The set of latent values may be determined by sampling from the latent distribution of latent values. If the generator network has been trained conditioned on additional data, e.g. labels, new videos may be generated conditioned on additional data e.g. a label provided to the generator network. In this way additional labelled videos may be generated, for example to supplement a dearth of unlabeled training videos.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
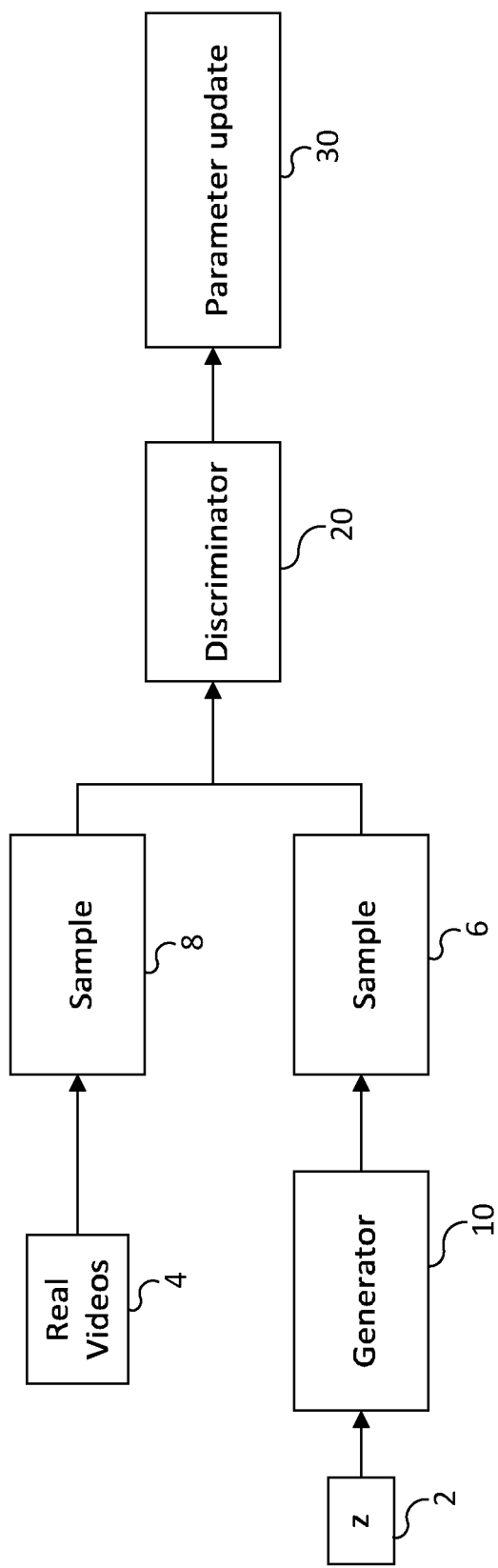
FIG. 1 shows an overview of a generative adversarial network for training a generator to generate videos according to an implementation.

This specification generally describes a neural network system for generating videos and methods for training such neural network systems. In particular, the present application describes implementations that apply Generative Adversarial Networks (GAN), trained on the complex datasets, to produce video samples of substantially higher complexity and fidelity than previous methods. The proposed model, termed Dual Video Discriminator GAN (DVD-GAN), scales to longer and higher resolution videos by leveraging a computationally efficient decomposition of its discriminator.

Modern deep generative models can produce realistic natural images when trained on high-resolution and diverse datasets. The generation of natural video is a further challenge for generative modeling, but one that is plagued by increased data complexity and computational requirements. For this reason, many previous methods for video generation have revolved around relatively simple datasets, or tasks where strong temporal conditioning information is available.

The present application focuses on the tasks of video synthesis and video prediction, and extends the strong results of generative image models to the video domain.

The present application introduces an efficient spatio-temporal decomposition of the discriminator which allows training on more complex data sets, including the Kinetics-600 data set—a complex dataset of natural videos an order of magnitude larger than other previously used datasets. The resulting model, the Dual Video Discriminator GAN (DVD-GAN), is able to generate temporally coherent, high-resolution videos of relatively high fidelity.

The present application introduces a scalable generative model of natural video, which can produce high-quality samples at resolutions up to 256×256 and lengths up to 48 frames. This provides state of the art for video synthesis and prediction.

Video synthesis (or video generation) aims to generate new instances of videos. In general, a video is a series of frames or images, changing over time. The implementations described herein rely on generator models that have been trained to generate videos based on an initial training set of videos. Generator models can be conditioned to generate videos having a certain set of characteristics based on a conditioning signal. For instance, generator models can be trained to generate videos of cats based on a first conditioning signal and to generate videos of dogs based on a second conditioning signal.

The exact formulation of the video generation task can differ in the type of conditioning signal provided. At one extreme lies unconditional video synthesis where the task is to generate any video following the training distribution. Another extreme is occupied by strongly-conditioned models, including generation conditioned on another video for content transfer, per-frame segmentation masks, or pose information.

In the middle ground, there are tasks that are more structured than unconditional generation, and yet are more challenging from a modeling perspective than strongly-conditional generation (which receives a large amount of information about the generated video through its input). The objective of class-conditional video synthesis is to generate a video of a given category (e.g., "riding a bike") while future video prediction is concerned with generation of continuing video given initial frames. These problems differ in several aspects, but share a common requirement of needing to generate realistic temporal dynamics, and this application is focused on these two problems.

Generative Adversarial Networks (GANs) are a class of generative models defined by a minimax game between a discriminator $\mathcal{D}$ and a generator $\mathcal{G}$. The generator $\mathcal{G}$ aims to generate realistic data (in this case, videos). The discriminator $\mathcal{D}$ aims to determine whether a given instance of data is generated by the generator (is synthesized data, or "fake") or was not generated by the generator (e.g. is "real" data).

Each of the generator and discriminator may be implemented via neural networks, wherein their output is determined through parameters of the respective neural network. These neural networks can be trained by adjusting the parameters to improve the result of an objective function (e.g. to reduce prediction error).

FIG. 1 shows an overview of a generative adversarial network for training a generator to generate videos according to an implementation. The GAN includes a generator 10 and a discriminator 20. The generator 10 takes as an input a latent variable (z) 2 sampled from a latent space and generates videos. These are sampled 6 and input into the discriminator 20. Equally, a set of real videos 4 and sampled 8 and input into the discriminator 20. For each input video, the discriminator 20 classifies the video as either real or synthesized (generated). This classification is then used to determine update 30 the parameters for the generator 10 and discriminator 20, e.g. through gradient descent.

Generally, the GAN objective involves finding an equilibrium to the following min-max problem which can be optimized through various methods, including gradient descent:

$$\min_{\mathcal{G}} \max_{\mathcal{D}} \mathbb{E}_{x \sim data(x)}[\log \mathcal{D}(x)] + \mathbb{E}_{z \sim p(z)}[\log(1 - \mathcal{D}(\mathcal{G}(z)))],$$

where:
x is an instance of data being discriminated (in this case, a set of one or more images from a video);
z is the latent variable drawn from a distribution p(z);
$\mathcal{D}$ (x) is a discriminator function aiming to discriminate between generated (synthesized) and non-generated (e.g. real) data;
$\mathcal{G}$ (z) is a generator function that aims to generate data through a mapping from the latent space z.

Specific implementations utilize a hinge formulation of the objective, which is optimized by gradient descent:

$$\mathcal{D}: \max_{\mathcal{D}} \mathbb{E}_{x \sim data(x)} [\rho(1 - \mathcal{D}(x))] + \mathbb{E}_{z \sim p(z)} [\rho(+\mathcal{D}(\mathcal{G}(z)))],$$

$$\mathcal{G}: \max_{\mathcal{G}} \mathbb{E}_{z \sim p(z)} [\mathcal{D}(\mathcal{G}(z))]$$

where ρ is the elementwise rectified linear unit, ReLU, function.

Nevertheless, other forms of objectives for generative adversarial learning may be utilized.

The discriminator may be trained to assign a high score (e.g. 1) to real data (e.g. data drawn from the original video data set) and a low score (e.g. 0) to generated data. In general, training aims to train the generator to maximize the discriminator output from generated data (train the generator to fool the discriminator, that is, to produce data that is incorrectly classified as "real" by the discriminator), whilst training the discriminator to minimize the number of incorrect classifications.

The primary contribution of the present application is the Dual Video Discriminator GAN (DVD-GAN), a generative video model of complex human actions built upon the state-of-the-art architecture while introducing scalable, video-specific generator and discriminator architectures.

In general, the architecture is divided into a generator that attempts to generate videos and a discriminator that aims to discriminate between videos generated by the generator (synthesized videos) and videos not generated by the generator (e.g. real, non-synthesized videos).

Unlike some of the prior work, the present implementations contain no explicit priors for foreground, background or motion (optical flow). Instead, implementations rely on a high-capacity neural network to learn this in a data-driven manner. While specific implementations described below contain sequential components (e.g. recurrent neural networks), they are not autoregressive in time or in space. In other words, the pixels of each frame do not directly depend on other pixels in the video, as would be the case for autoregressive models or models generating one frame at a time.

Generating long and high resolution videos is a heavy computational challenge. For instance, individual samples from Kinetics-600 (just 10 seconds long) contain upwards of 16 million pixels which need to be generated in a consistent fashion. This is a particular challenge to the discriminator. For example, a generated video might contain an object which leaves the field of view and incorrectly returns with a different color. Here, the ability to determine whether this video is generated or real is only possible by comparing two different spatial locations across two (potentially distant) frames. Given a video with length T, height H, and width W, discriminators that process the entire video would have to process all H×W×T pixels—limiting the size of the model and the size of the videos being generated.

The implementations described herein tackle this scale problem by using two discriminators: a spatial discriminator $\mathcal{D}_S$ and a temporal discriminator $\mathcal{D}_T$. The spatial discriminator discriminates based on spatial content within individual frames (i.e. not based on temporal features). In contrast, the temporal discriminator discriminates over time (over multiple frames). To achieve this efficiently, the content that is fed into the temporal discriminator is downsampled with respect to the spatial features, whilst the content that is fed into the spatial discriminator is downsampled with regard to temporal features.

This results in an architecture where the discriminators do not process the entire video's worth of pixels, since $\mathcal{D}_S$ processes only k×H×W pixels and $\mathcal{D}_T$ only $$T \times \frac{H}{j} \times \frac{W}{j},$$

wherein k<T and j>1. For a 48 frame video at 128×128 resolution, this reduces the number of pixels to process per video from 786432 to 327680: a 58% reduction. Despite this decomposition, the discriminator objective is still able to penalize almost all inconsistencies which would be penalized by a discriminator judging the entire video. $\mathcal{D}_T$ judges any temporal discrepancies across the entire length of the video, and $\mathcal{D}_S$ can judge any high resolution details.

Figure 2:
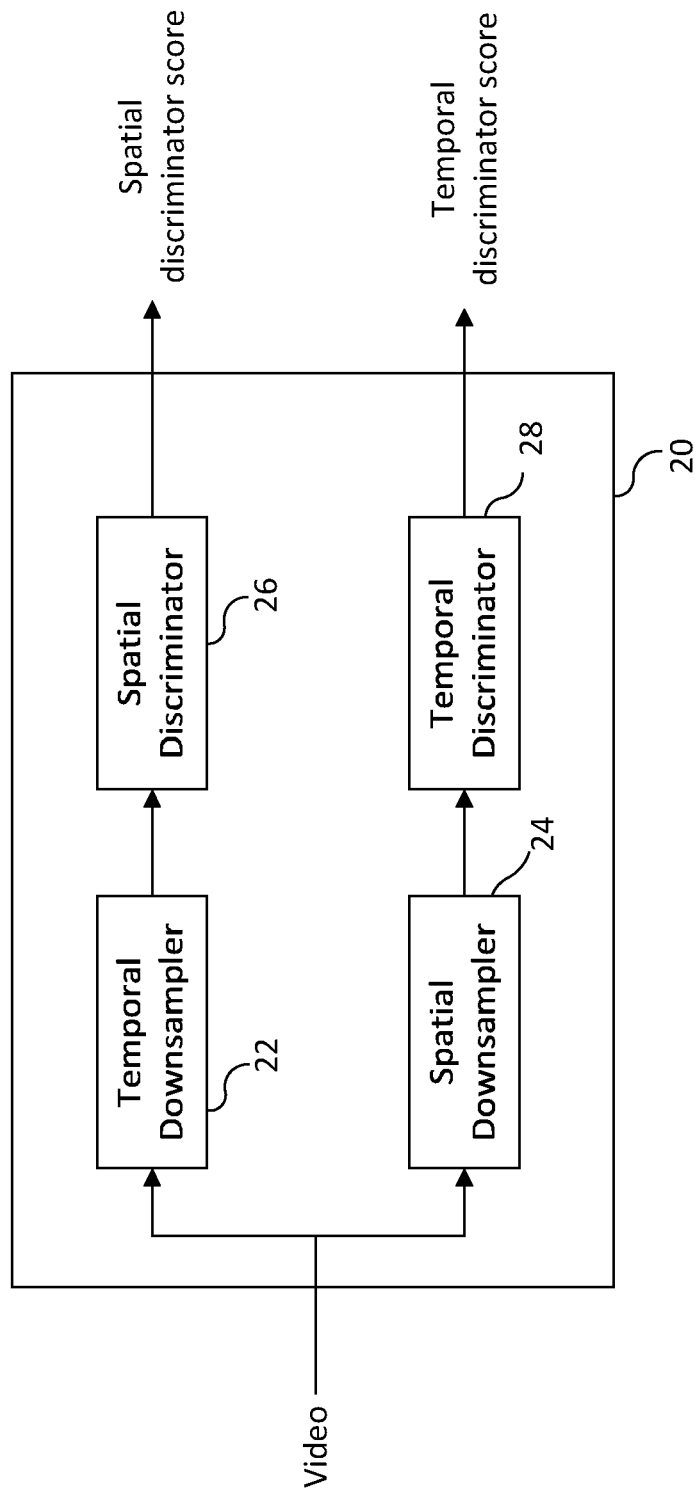
FIG. 2 shows a discriminator according to an implementation.

FIG. 2 shows a discriminator 20 according to an implementation. The discriminator 20 includes a spatial discriminator 26 and a temporal discriminator 28. A video is input into the discriminator 20. This video is input into a temporal downsampler 22 which reduces the temporal resolution on the video before inputting the result into the spatial discriminator 26. The temporal downsampler 22 achieves this by randomly sampling k full-resolution frames (where k is less than the full number of frames in the input video). In one implementation, k=8. The performance of this implementation is discussed towards the end of this application.

The spatial discriminator 26 judges each frame that it receives individually (determining whether each one is a real frame or synthesized frame). The final spatial discriminator score of the spatial discriminator 26 is a combination (e.g. sum) of the per-frame scores.

The temporal discriminator 28 must provide $\mathcal{G}$ with the learning signal to generate movement (something not evaluated by the spatial discriminator 26). To make the model scalable, a spatial downsampling function $\phi(\cdot)$ is applied to the whole input video via a spatial downsampler 24 before inputting the result into the temporal discriminator 28. The spatial sampling may be reduced by a factor j. In one implementation, $\phi(\cdot)$ is chosen to be 2×2 average pooling (although alternative implementations are discussed later in this application). In this case, the factor j is 2. Nevertheless, different amounts of scaling may be applied to different dimensions (e.g. height H or width W) within each frame. Every frame from the input video is spatially downsampled before the result is input into the temporal discriminator. This maintains the temporal resolution but reduces the spatial resolution.

The temporal discriminator 28 assesses the spatially downsampled frames as a group and outputs a temporal discriminator score.

The temporal and spatial discriminator scores can be used to determine loss values for the spatial and temporal discriminators respectively. This can be based on whether the ground truth classification of the input video as either real or generated. The loss values from the temporal and spatial discriminators can be combined (e.g. through addition) to produce a combined loss for the input video. The combined loss can be fed back to the generator when updating the parameters of the generator.

Figure 3:
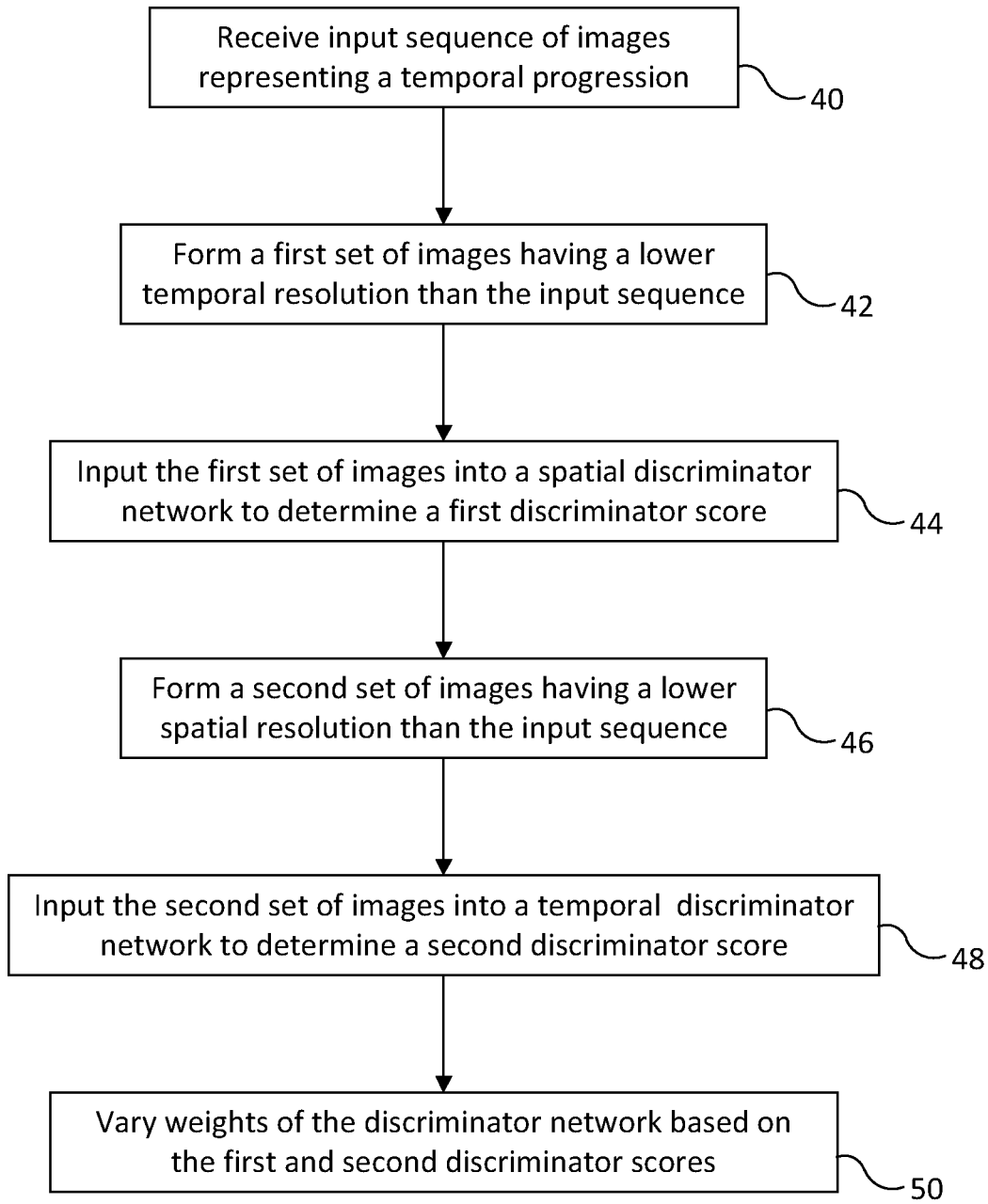
FIG. 3 shows a method for training a discriminator according to an implementation.

FIG. 3 shows a method for training a discriminator according to an implementation. The method is performed using a discriminator network comprising a temporal discriminator network and a spatial discriminator network.

The method starts with the receipt of an input sequence of images representing a temporal progressing (e.g. a video) 40.

A first set of images having a lower temporal resolution than the input sequence is then formed 42. The spatial resolution of the first set of images may be equivalent to that of the input sequence, or may be reduced relative to the input sequence, but still higher than the spatial resolution of the second set (to be discussed below). The first set of images is input 44 into the spatial discriminator network to determine a first discriminator score. This may be based on the spatial features of each image in the first set.

A second set of images having a lower spatial resolution than the input sequence is then formed 46. The temporal resolution of the first set of images may be equivalent to that of the input sequence, or may be reduced relative to the input sequence, but still higher than the temporal resolution of the first set. The second set of images is input 48 into the temporal discriminator network to determine a second discriminator score. This may be based on the temporal features of the images in the second set.

The weights of the discriminator network (i.e. the weights of the spatial discriminator and the temporal discriminator) are then varied 50 based on the first and second discriminator scores.

It should be noted that the order of the steps in the method of FIG. 3 may be varied. For instance, steps 42 and 44 may be performed before, after, or in parallel to, steps 46 and 48.

In addition to training the discriminators, the losses from the spatial and temporal discriminators may be used to train the generator network to produce more realistic videos. This may be achieved through combining the losses from the two discriminators to update the parameters of the generator based on the combined loss, or by performing independent updates to the generator based on each loss individually. When combining the losses, the losses may be summed together to produce the combined loss.

Whilst the above discussing provides a broad overview of the methodology described herein, further detail is provided below with regard to specific implementations. Nevertheless, it will be appreciated that these are provided as examples of specific implementations, and this application is not limited to these specific implementations.

Figure 4:
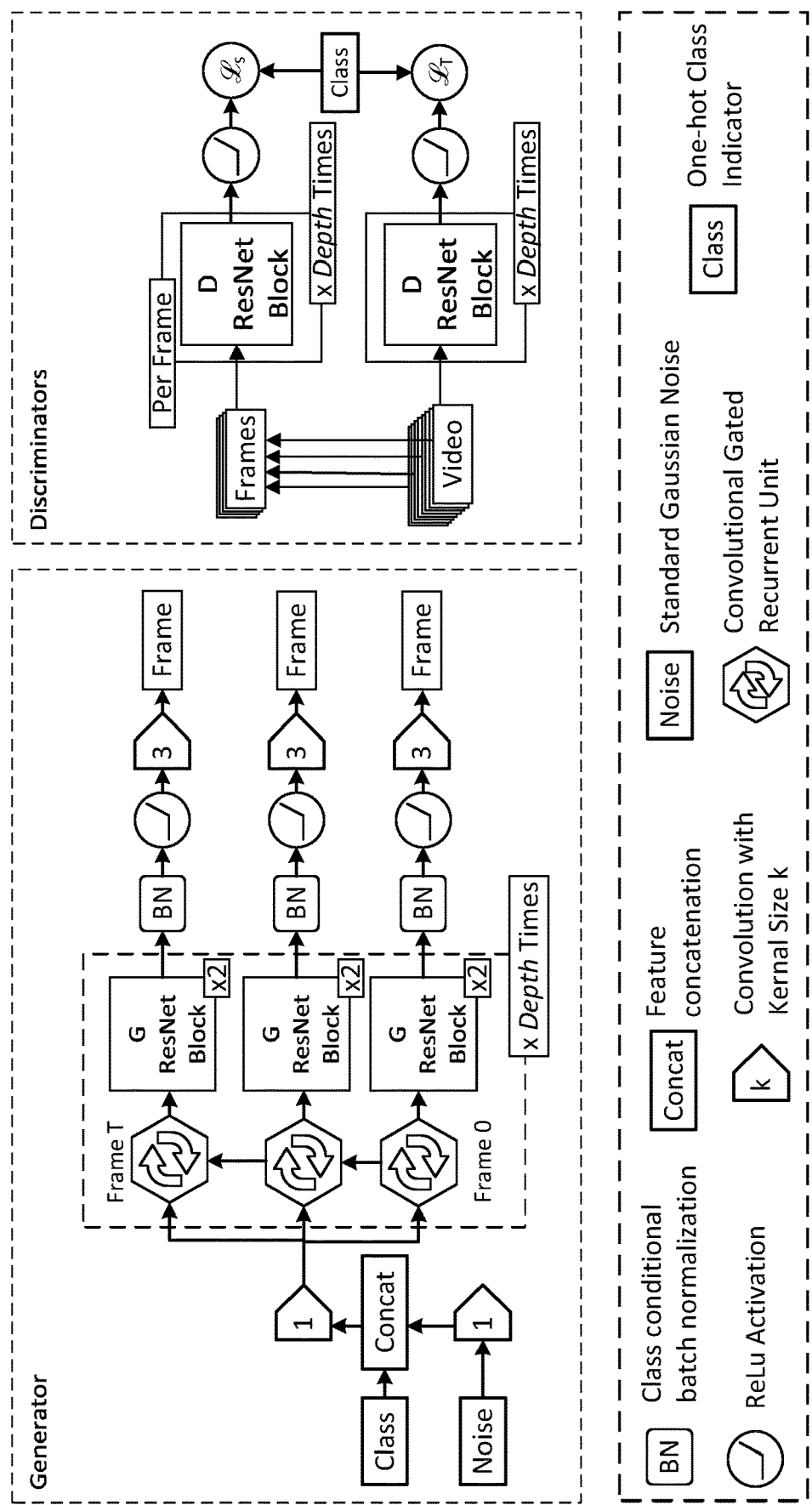
FIG. 4 shows an overview of the architecture of a generator and discriminator according to an implementation.
Figure 5:
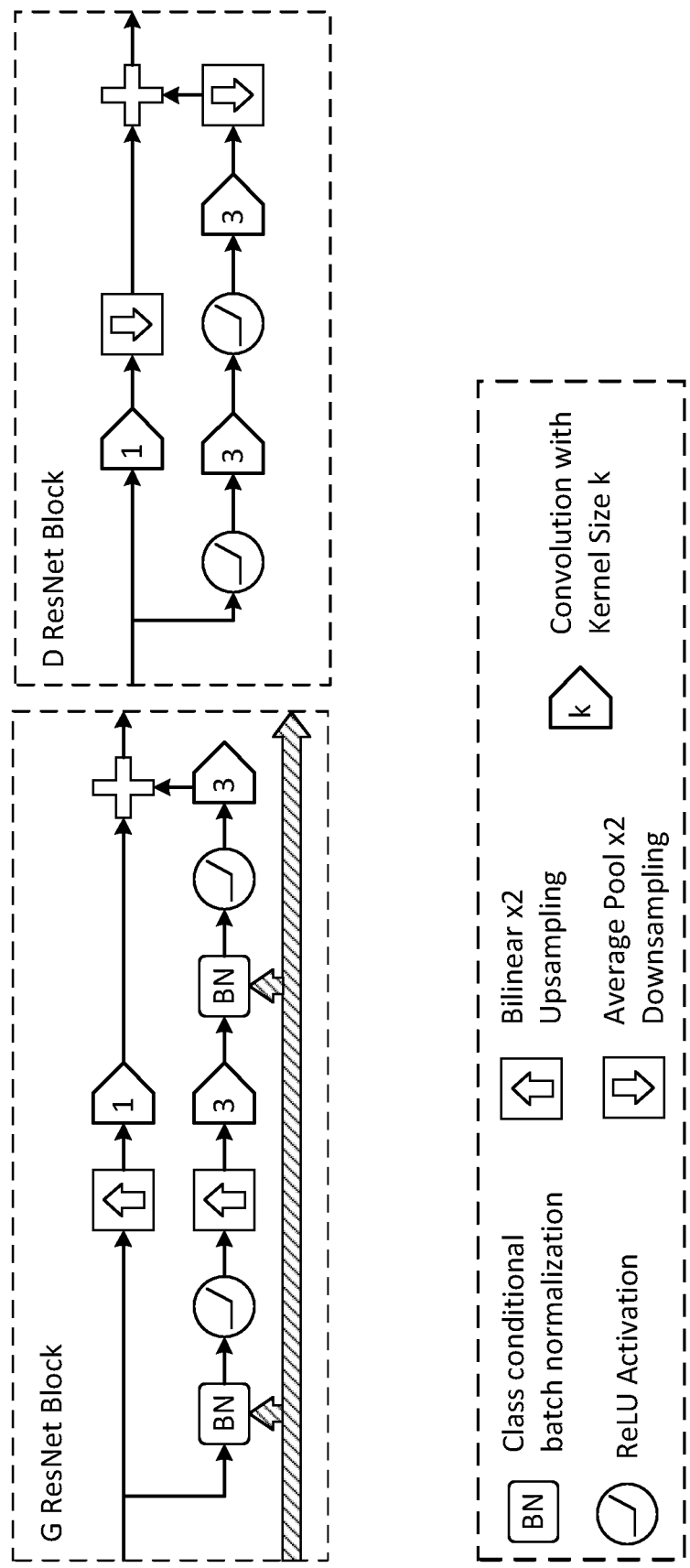
FIG. 5 shows the architecture of the residual networks used in the generator and discriminator of FIG. 4.

FIG. 4 shows an overview of the architecture of a generator and discriminator according to an implementation. FIG. 5 shows the architecture of the residual networks used in the generator and discriminator of FIG. 4.

In this implementation, the generator $\mathcal{G}$ takes an input comprising a class indicator and a noise input. The class indicator conditions the generator to produce videos of a particular class. The class indicator may be a learned linear embedding e(y) of the desired class y (e.g. a one-hot vector or any other form of class encoding into a latent space representing various features of the various available classes). The noise input may be a Gassian latent noise $z \sim \mathcal{N}(0, I)$. In one implementation, each input is a 120-dimensional vector, although other sizes of inputs may be used.

$\mathcal{G}$ starts by computing an affine transformation of [z, e(y)] to a tensor (in one implementation, this is a [4, 4, ch$_0$]-shaped tensor). In FIG. 1 this is represented as a 1×1 convolution. [z, e(y)] is used to condition the generator. In the present implementation, his is achieved through input [z, e(y)] into each class-conditional Batch Normalization layer throughout $\mathcal{G}$ (this input is shown as the arrow with cross-hatching).

The convolution is then treated as the input (at each frame being generated) to a Convolutional Gated Recurrent Unit whose update rule for input $x_t$ and previous output $h_{t-1}$ is given by the following:

$$r = \sigma(W_{r*3}[h_{t-1}; x_t] + b_r)$$

$$u = \sigma(W_{u*3}[h_{t-1}; x_t] + b_u)$$

$$c = \rho(W_{c*3}[x_t; r \odot h_{t-1}] + b_c)$$

$$h_t = u \odot h_{t-1} + (1-u) \odot c$$

where $h_t$ is the output for time t, r is a reset gate vector, $W_r$, $W_u$ and $W_c$ are parameter matrices. In these equations $\sigma$ and $\rho$ are the elementwise sigmoid and recurrent linear unit (ReLU) functions respectively, the $*_n$ operator represents a convolution with a kernel of size n×n, and the $\odot$ operator is an elementwise multiplication. Brackets are used to represent a feature concatenation. This recurrent neural network (RNN) is unrolled once per frame.

The output of this RNN for each frame is processed by two residual blocks (residual networks, ResNets), the architecture of which is shown in FIG. 5. The time dimension is combined with the batch dimension in the residual networks, so each frame proceeds through the blocks independently.

The output of the residual network blocks has width and height dimensions which are doubled (upsampling is skipped in the first block). This is repeated a number of times, with the output of one RNN+residual group being fed as the input to the next group, until the output tensors have the required spatial dimensions.

The output each residual network is passed through batch normalization, a rectified linear unit (ReLU) and a further convolution (this time, of kernel size 3) in order to form each output frame. This implementation does not reduce over the time dimension when calculating Batch Normalization statistics. This prevents the network from utilizing the Batch Normalization layers to pass information between time steps.

Referring to FIG. 5, the architecture of the generator residual network consists of two paths. The input is split into a first path and a second path. The first path includes an upsampling step (in this case, bilinear ×2 upsampling) followed by a convolution of kernel size 1. The second path includes batch normalization, taking as an input the tensor including the class and noise vectors [z, e(y)]. Following batch normalization, a rectified linear unit (ReLU) is applied before upsampling and a convolution of kernel size 3. A further batch normalization step is applied (again, taking an input of [z, e(y)]) followed by an additional ReLU and convolution step. The signals from the two paths are then summed and output.

The generator model has a network width, which is determined by the product of a channel multiplier ch with a constant for each layer in the network. In a specific implementation, the layer-wise constants for $\mathcal{G}$ are [8, 8, 8, 4, 2] for 64×64 videos and [8, 8, 8, 4, 2, 1] for 128×128. The width of the i-th layer is given by the product of ch and the i-th constant and all layers prior to the residual network in $\mathcal{G}$ use the initial layer's multiplier and the product of that and ch is referred to as $ch_0$. ch in these specific implementations is 128 for videos with 64×64 resolution and 96 otherwise. The corresponding ch lists for both $\mathcal{D}_T$ and $\mathcal{D}_S$ are [2, 4, 8, 16, 16] for 64×64 resolution and [1, 2, 4, 8, 16, 16] for 128×128.

As shown in FIG. 4, the discriminator includes two sub-discriminators, a spatial and a temporal discriminator. The discriminator receives as an input a video. For spatial discrimination, the video a temporally sampled, to reduce the temporal resolution. This includes selecting a subset of framed from the video. Each of the sampled frames is then passed through a discriminator residual network block, shown in more detail in FIG. 5. The output is passed through a rectified linear unit. Accordingly, a score is calculated for each of the (potentially uniformly) sampled k frames (in one implementation, k=8). The spatial discriminator output is the sum over the per-frame scores.

The temporal discriminator $\mathcal{D}_T$ has a similar architecture, but instead of sampling over time, the video is sampled over the spatial dimensions. That is, the input video is pre-processed to downsample over the spatial dimensions (reduce the spatial resolution of the video). In a specific implementation, a 2×2 average-pooling downsampling function $\phi$ is utilised for this purpose. In addition, the first two residual blocks of $\mathcal{D}_T$ are 3D, where every convolution is replaced with a 3D convolution with a kernel size of 3×3×3. Again, the output of the residual block is passed through a rectified linear unit to determine the activation and a temporal discrimination score is determined.

For each of the spatial and temporal discriminators, a loss value is calculated ($\mathcal{L}_S$ and $\mathcal{L}_T$ respectively) based on the respective score and the class for the input video. Accordingly, the loss function for each discriminator is conditioned on the class. This can be achieved through projection-based class conditioning. This involves calculating the loss through use of an inner product between an embedded condition vector and the output of the discriminator.

As shown in FIG. 5, the discriminator residual networks include two paths. The first path includes a convolution of kernel size 3 followed by a downsampling step (average pool ×2 downsampling. The second path includes a rectified linear unit followed by a convolution of kernel size 3 followed by another ReLU followed by a downsampling step (average pool ×2 downsampling). The signals from the two paths are summed to form a combined output.

Sampling from the above implementations is very efficient, as the core of the generator architecture is a feed-forward convolutional network: two 64×64 48-frame videos can be sampled in less than 150 ms on a single TPU core. The dual discriminator $\mathcal{D}$ may be updated twice for every update of $\mathcal{G}$. Spectral Normalization can be used for all weight layers (approximated by the first singular value) and orthogonal initialization of weights. Sampling can be carried out using the exponential moving average of $\mathcal{G}$'s weights, which is accumulated with decay $\gamma=0.9999$ starting after 20,000 training steps.

In one implementation, the model is optimized using a batch size of 512 and a learning rate of $1 \cdot 10^{-4}$ and $5 \cdot 10^{-4}$ for $\mathcal{G}$ and $\mathcal{D}$ respectively. Class conditioning in $\mathcal{D}$ can be projection-based whereas $\mathcal{G}$ may rely on class-conditional Batch Normalization: equivalent to standard Batch Normalization without a learned scale and offset, followed by an elementwise affine transformation where each parameter is a function of the noise vector and class conditioning.

Implementations also apply this methodology to future video prediction. Future video prediction is the problem of generating a sequence of frames which directly follow from one (or a number) of initial conditioning frames. Both this and video synthesis require $\mathcal{G}$ to learn to produce realistic scenes and temporal dynamics, however video prediction further requires $\mathcal{G}$ to analyze the conditioning frames and discover elements in the scene which will evolve over time.

In order to provide future video prediction, a simple modification to the above methodology may be implemented to facilitate the required additional conditioning. This includes passing an initial set of frames through a discriminator (similar to the spatial discriminator network, $\mathcal{D}_s$) and conditioning the generator based on the output of this discriminator.

Figure 6:
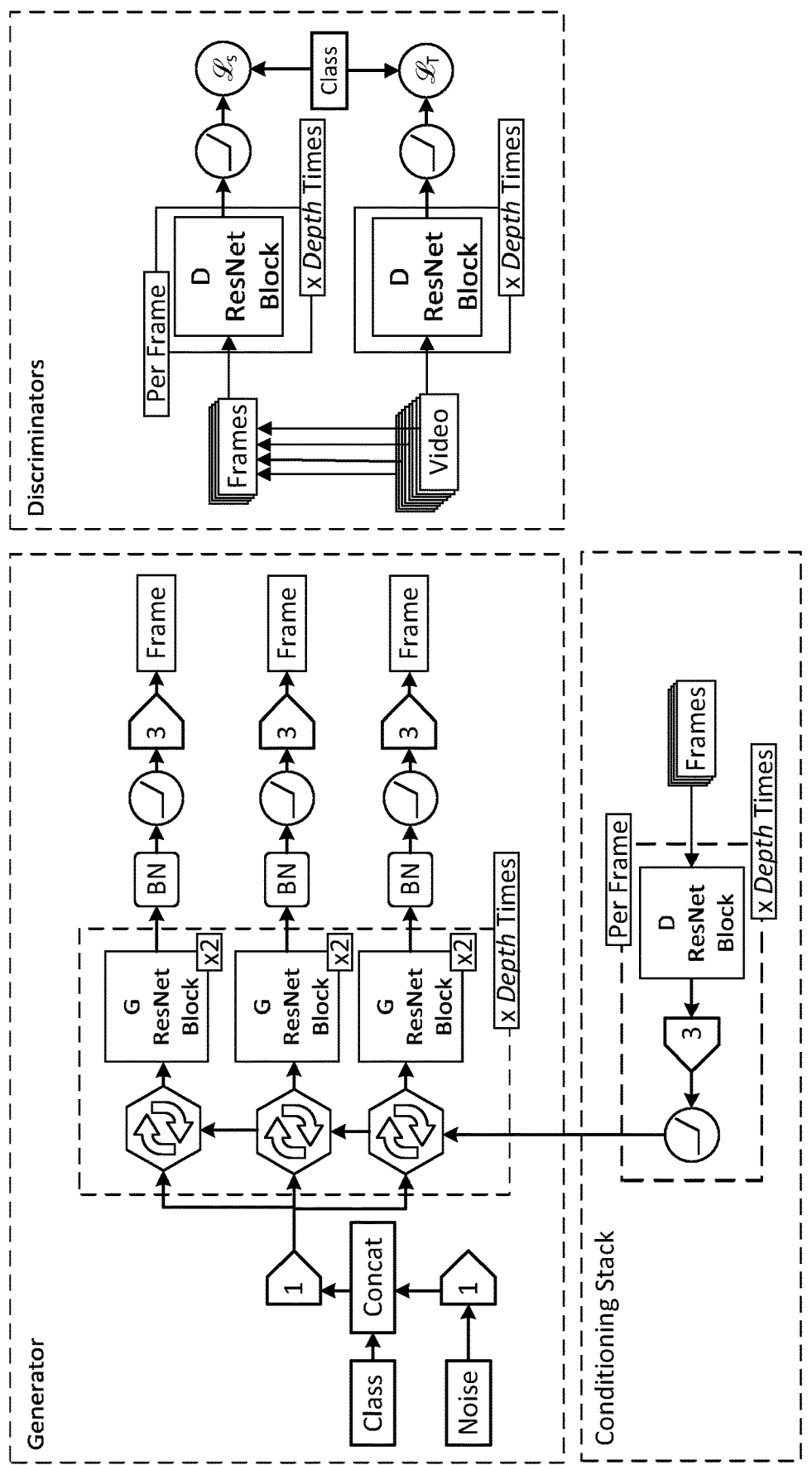
FIG. 6 shows an architecture for a frame-conditional generator according to an implementation.

FIG. 6 shows an architecture for a frame-conditional system according to an implementation. The architecture is the same as shown in FIG. 4; however a conditioning stack is provided to condition the generator on previous frames for future video prediction. Nevertheless, it will be appreciated that this methodology can be generalized to any appropriate architecture in which the generator may be conditioned using previous frames in the sequence.

Given C conditioning frames, the modified generator passes each frame separately through a deep residual network identical to $\mathcal{D}_s$ ($\mathcal{D}$ ResNet Block). The (near) symmetric design of the residual blocks of $\mathcal{G}$ and $\mathcal{D}_s$ means that each output from a $\mathcal{D}$-style residual block has a corresponding intermediate tensor in $\mathcal{G}$ of the same spatial resolution. After each block the resulting features for each conditioning frame are stacked in the channel dimension and passed through a 3×3 convolution and ReLU activation.

The resulting tensor is used as the initial state for the Convolutional GRU in the corresponding block in $\mathcal{G}$. Note that the frame conditioning stack reduces spatial resolution while $\mathcal{G}$ increases resolution. Therefore the smallest features of the conditioning frames (which have been through the most layers) are input earliest in $\mathcal{G}$ and the larger features (which have been through less processing) are input to $\mathcal{G}$ towards the end.

$\mathcal{D}_T$ operates on the concatenation of the conditioning frames and the output of $\mathcal{G}$, meaning that it does not receive any extra information detailing that the first C frames are special. However to reduce wasted computation the first C frames are not sampled for $\mathcal{D}_S$ on real or generated data. This technically means that $\mathcal{D}_S$ will never see the first few frames from real videos at full resolution, but this has not proven to be an issue in experiments. Finally, the video prediction variant does not condition on any class information, allowing this methodology to directly be compared with prior art. This is achieved by settling the class id of all samples to 0.

Certain implementations make use of Separable Attention (although the above implementations do not make use of this). Separable Attention is a module which allows self-attention to be applied to spatio-temporal features which are too large for the quadratic memory cost of traditional self-attention.

Self-attention on a single batch element X of shape [N, C] (where N is the number of spatial positions and C is the number of features per location) can be given as:

$$\text{Self Attention}(X) = \text{softmax}[XQ(XK)^T]XV$$

where Q, K, V are parameters all of shape [C, C] and the softmax is taken over the final axis. Batched self-attention is identical, except X has a leading batch axis and matrix multiplications are batched (i.e. the XQ multiplies two tensors of shape [B, N, C] and [C, C] and results in shape [B, N, C]).

Separable Attention recognizes the natural decomposition of N=H×W×T by attending over each axis separately and in order. That is, first each feature is replaced with the result of a self-attention pass which only considers other features at the same H/W location (but across different frames), then the result of that layer (which contains cross-temporal information) is processed by a second self-attention layer which attends to features at different heights (but at the same width-point, and at the same frame), and then finally one which attends over width. The Python pseudocode below implements this module assuming that X is given with the interior axes already separated (i.e., X is of shape [B, H, W, T, C]).

```
def self_attention(x, q, k, v):
    xq, xk, xv = np.matmul(x, q), np.matmul(x, k), np.matmul(x, v)
    qv_correlations = np.matmul(xq, np.transpose(xk))
    return np.matmul(np.softmax(qv_correlations, axis=-1), xv)
def separable_attention(x, q1, k1, v1, q2, k2, v2, q3, k3, v3):
    b, h, w, t, c = x.shape
    # Apply attention over time.
    x = np.reshape(x, [b*h*w, t, c])
    x = self_attention(x, q1, k1, v1)
    # Apply attention over height.
    x = np.reshape(x, [b*w*t, h, c])
    x = self_attention(x, q2, k2, v2)
    # Apply attention over width.
    x = np.reshape(x, [b*h*t, w, c])
    x = self_attention(x, q3, k3, v3)
    return x
```

Separable Attention crucially reduces the asymptotic memory cost from $O((HWT)^2)$ to max $O(H^2WT)$, $O(HW^2T)$, $O(HWT^2)$ while still allowing the result of the module to contain features at each location accumulated from all other features at any spatio-temporal location.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for training a discriminator network for use in training a generator to generate a sequence of images representing a temporal progression, the discriminator network being for distinguishing between sequences of images generated by the generator network and sequences of images which are not generated by the generator network, the discriminator network comprising a temporal discriminator network for discriminating based on temporal features and a spatial discriminator network for discriminating based on spatial features, the temporal discriminator network and the spatial discriminator network each comprising a multi-layer network of neurons in which each layer performs a function defined by corresponding weights, the method comprising:

receiving an input sequence of images representing a temporal progression;

forming, from the input sequence, a first set of images having a lower temporal resolution than the input sequence, and inputting the first set into the spatial discriminator network to determine, based on the spatial features of each image in the first set, a first discriminator score representing a probability that the input sequence has been generated by the generator network, wherein the first set comprises more than one image and determining the first discriminator score comprises: determining, for each image in the first set, a corresponding discriminator value representing a probability that the image was generated by the generator network, and combining the discriminator values for the images in the first set to produce the first discriminator score, and wherein each discriminator value is determined based on only a single corresponding image from the first set;

forming, from the input sequence, a second set of images having a lower spatial resolution than the input sequence, and inputting the second set into the temporal discriminator network to determine, based on the temporal features of the images in the second set, a second discriminator score representing a probability that the input sequence has been generated by the generator network; and varying weights of the discriminator network based on the first discriminator score and the second discriminator score, wherein the first set and the second set include images that span the same time interval during which the input sequence of images are taken, wherein the first set has fewer images than the second set, and wherein each image in the second set has a lower spatial resolution than the images in the first set.

2. The method of claim 1, wherein forming the first set comprises selecting a subset comprising one or more images from the input sequence of images, such that the first set has fewer images than the input sequence.

3. The method of claim 2, wherein the subset is selected at random from the input sequence of images.

4. The method of claim 1, wherein forming the second set comprises reducing the spatial resolution for each image in the input sequence of images.

5. The method of claim 4, wherein the second set comprises a reduced spatial resolution version of each image in the input sequence.

6. The method of claim 1, wherein varying weights of the discriminator network comprises varying weights of the spatial discriminator network based on the first discriminator score and varying weights of the temporal discriminator network based on the second discriminator score.

7. A system comprising one or more computers and one or more storage devices storing instructions that when executed by the one or more computers cause the one or more computers to perform operations for training a discriminator network for use in training a generator to generate a sequence of images representing a temporal progression, the discriminator network being for distinguishing between sequences of images generated by the generator network and sequences of images which are not generated by the generator network, the discriminator network comprising a temporal discriminator network for discriminating based on temporal features and a spatial discriminator network for discriminating based on spatial features, the temporal discriminator network and the spatial discriminator network each comprising a multi-layer network of neurons in which each layer performs a function defined by corresponding weights, the operations comprising:

receiving an input sequence of images representing a temporal progression; forming, from the input sequence, a first set of one or more images having a lower temporal resolution than the input sequence, and inputting the first set into the spatial discriminator network to determine, based on the spatial features of each image in the first set, a first discriminator score representing a probability that the input sequence has been generated by the generator network, wherein the first set comprises more than one image and determining the first discriminator score comprises: determining, for each image in the first set, a corresponding discriminator value representing a probability that the image was generated by the generator network, and combining the discriminator values for the images in the first set to produce the first discriminator score, and wherein each discriminator value is determined based on only a single corresponding image from the first set;

forming, from the input sequence, a second set of images having a lower spatial resolution than the input sequence, and inputting the second set into the temporal discriminator network to determine, based on the temporal features of the images in the second set, a second discriminator score representing a probability that the input sequence has been generated by the generator network; and varying weights of the discriminator network based on the first discriminator score and the second discriminator score, wherein the first set and the second set include images that span the same time interval during which the input sequence of images are taken, wherein the first set has fewer images than the second set, and wherein each image in the second set has a lower spatial resolution than the images in the first set.

8. The system of claim 7, wherein forming the first set comprises selecting a subset comprising one or more images from the input sequence of images, such that the first set has fewer images than the input sequence.

9. The system of claim 8, wherein the subset is selected at random from the input sequence of images.

10. The system of claim 7, wherein forming the second set comprises selecting two or more images from the input sequence and reducing the spatial resolution for each of the selected images.

11. The system of claim 10, wherein the second set comprises a reduced spatial resolution version of each image in the input sequence.

12. The system of claim 7, wherein the first set has a higher temporal resolution but lower spatial resolution than the second set.

13. The system of claim 7, wherein varying weights of the discriminator network comprises varying weights of the spatial discriminator network based on the first discriminator score and varying weights of the temporal discriminator network based on the second discriminator score.

* * * * *